United States Patent
Tasaki et al.

(10) Patent No.: US 6,389,239 B1
(45) Date of Patent: May 14, 2002

(54) LIQUID DETECTION DEVICE, FUSING UNIT USING THE SAME, AND ELECTROPHOTOGRAPHIC APPARATUS

(75) Inventors: Hidefumi Tasaki; Tomoyuki Nagamine; Hiroshi Kobayashi; Hiroyuki Okitsu; Katsumi Takada, all of Kawasaki (JP)

(73) Assignee: Fujitsu, Limited, Kawasaki (JP)

(*) Notice: Subject to any disclaimer, the term of this patent is extended or adjusted under 35 U.S.C. 154(b) by 0 days.

(21) Appl. No.: 09/842,681

(22) Filed: Apr. 27, 2001

(30) Foreign Application Priority Data

Dec. 27, 2000 (JP) ......................... 2000-398818

(51) Int. Cl.$^7$ ..................... G03G 15/20; G01F 23/28
(52) U.S. Cl. ..................... 399/24; 73/293; 250/903; 340/619
(58) Field of Search ..................... 399/24, 33, 325; 347/7; 378/52; 340/619; 73/293; 250/577, 900.03

(56) References Cited

U.S. PATENT DOCUMENTS

| | | | | |
|---|---|---|---|---|
| 3,384,885 A | * | 5/1968 | Forbush | ................ 250/901 X |
| 6,012,795 A | | 1/2000 | Saito et al. | |
| 6,024,428 A | | 2/2000 | Uchikata | |

FOREIGN PATENT DOCUMENTS

| | | | |
|---|---|---|---|
| JP | 56-57071 | * | 5/1981 |
| JP | 60-50422 | * | 3/1985 |
| JP | 5-332812 | | 12/1993 |
| JP | 9-29989 | | 2/1997 |
| JP | A-11-138842 | | 5/1999 |

* cited by examiner

Primary Examiner—Joan Pendegrass
(74) Attorney, Agent, or Firm—Armstrong, Westerman & Hattori, LLP

(57) ABSTRACT

Disclosed is a liquid detection device wherein a condition in which there is no liquid remaining in either a storage member or a tank and a condition in which there is liquid remaining in at least either the storage member or the tank are easily discriminated using a single mechanism. When there is oil (liquid) remaining in at least either the oil tank or the impregnated member (storage member), light emitted from a light emitting part is passed into the oil through a prism face located partway along the light path, and does not reach a light receiving part. On the other hand, when there is no oil remaining in either the oil tank or the impregnated member, the emitted light reaches the light receiving part. When the oil tank itself is not mounted, the light emitted from the light emitting part also reaches the light receiving part. When the light emitted from the light emitting part is not detected by the light receiving part, a controller determines that there is oil.

7 Claims, 8 Drawing Sheets

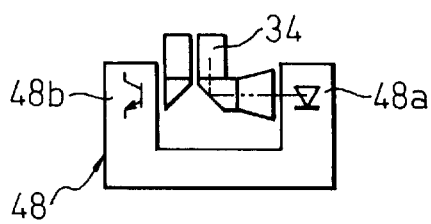
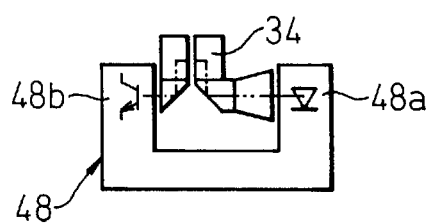
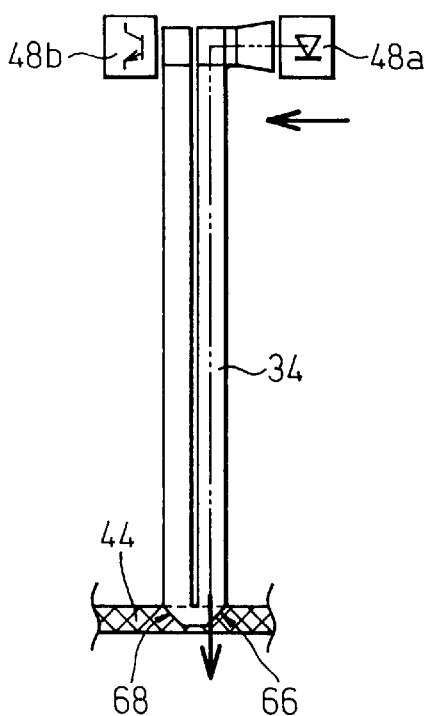
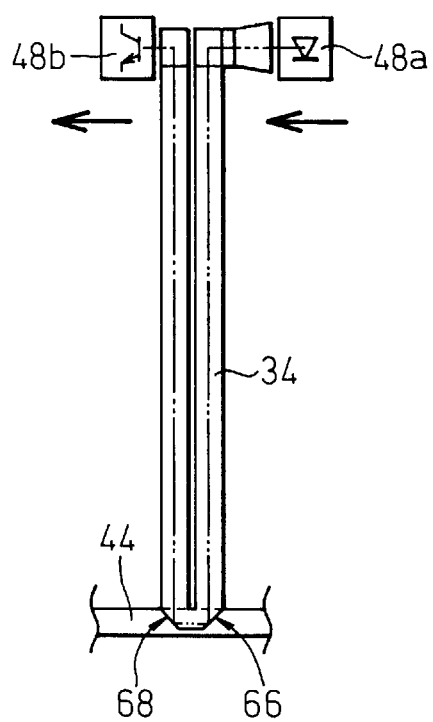
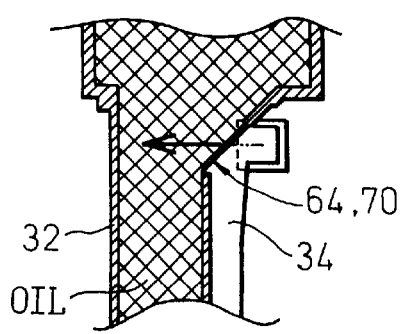
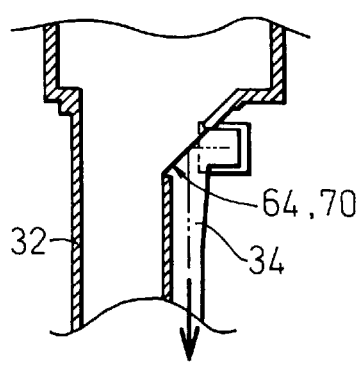

Fig. 8

| TANK | OIL REMAINING IN TANK | OIL REMAINING IN IMPREGNATED MEMBER | LIGHT DETECTION | PRINTING | LIGHT PATH |
|---|---|---|---|---|---|
| NOT MOUNTED | — | YES OR NO | POSSIBLE | NOT READY | |
| MOUNTED | NO | NO | POSSIBLE | NOT READY | |
| MOUNTED | YES | NO | NOT POSSIBLE | READY | |
| MOUNTED | NO | YES | NOT POSSIBLE | READY | |
| MOUNTED | YES | YES | NOT POSSIBLE | READY | |

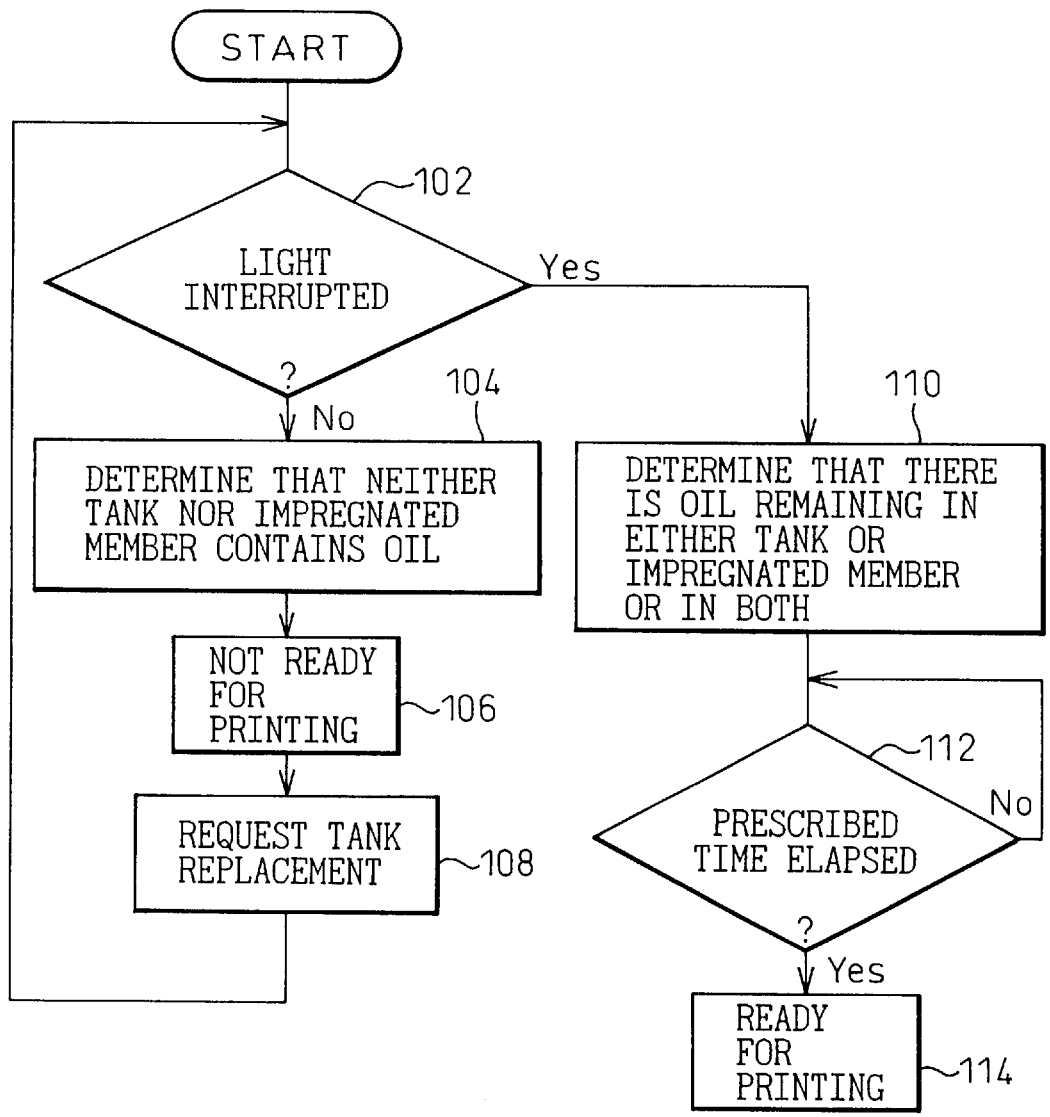

LIQUID DETECTION DEVICE, FUSING UNIT USING THE SAME, AND ELECTROPHOTOGRAPHIC APPARATUS

BACKGROUND OF THE INVENTION

1. Field of the Invention

The present invention relates to a liquid detection device for detecting the presence or absence of a liquid in a liquid supply mechanism which is equipped with a storage member for temporarily storing a liquid to be supplied and a liquid tank for replenishing the storage member with the liquid. More particularly, the invention relates to a device that may be advantageously used for detecting the presence or absence of an offset prevention oil in a fusing unit provided in an electrophotographic apparatus.

2. Description of the Related Art

In a fusing unit provided in an electrophotographic apparatus such as an electrophotographic printer or electrophotographic copier, oil is applied to a roller to prevent offset, a phenomenon in which toner sticks to the roller. The oil supply mechanism provided for this purpose comprises an impregnated member formed from a porous material, such as a felt or sponge, and a detachable oil tank for replenishing the impregnated member with oil.

In the prior art, when detecting the presence or absence of oil remaining in such an oil supply mechanism, it has not been possible to detect the oil remaining in the impregnated member simultaneously with the oil remaining in the tank, and separate detection mechanisms have had to be provided if the amounts of oil remaining in both are to be detected. Furthermore, since it is difficult to detect the oil remaining in the impregnated member, it has been widely practiced to only detect the oil remaining in the tank and relay on guesswork about the amount of oil remaining in the impregnated member.

However, in an apparatus that issues a tank replacement request only by detecting the presence or absence of oil remaining in the tank, there can occur cases where the tank is replaced when the impregnated member is saturated with oil. In such cases, oil may be excessively supplied to the impregnated member. Conversely, when there is oil remaining in the tank, but no oil remaining in the impregnated member, sufficient oil may not be applied.

On the other hand, in an apparatus that is equipped with oil detection mechanisms for both the impregnated member and tank, and that issues a tank replacement request by detecting both the impregnated member and tank being depleted of oil, there arises the problem that not only the cost but also the complexity of control increases.

SUMMARY OF THE INVENTION

The present invention has been devised in view of the above problems, and an object of the invention is to provide a low-cost liquid detection device wherein, in a liquid supply mechanism equipped with a storage member for temporarily storing a liquid to be supplied and a liquid tank for replenishing the storage member with the liquid, a condition in which both the storage member and the tank have been depleted of the liquid and a condition in which there is liquid remaining in at least either the storage member or the tank can be easily discriminated using a single mechanism.

To achieve the above object, according to a first aspect of the invention, there is provided a liquid detection device for detecting the presence or absence of a liquid, the device equipped with a storage member for temporarily storing the liquid for supply and a liquid tank for replenishing the storage member with the liquid, the device comprising: a prism for forming a light path, having at least a first side which, when there is no liquid remaining in the liquid tank, reflects incident light into the prism and, when there is the liquid remaining in the liquid tank, lets the incident light pass therethrough into the liquid, and a second side which, when there is no liquid remaining in the storage member, reflects incident light into the prism and, when there is the liquid remaining in the storage member, lets the incident light pass therethrough into the liquid; light emitting means for emitting light into the prism; and light receiving means disposed in such a position as to be able to receive light that was emitted into the prism, reflected at the first side or the second side, and passed through the prism.

In the liquid detection device having the above construction, when there is liquid remaining in the liquid tank, the light emitted from the light emitting means into the prism is passed into the liquid without being reflected at the first face of the prism, and therefore, does not reach the light receiving means. Likewise, when there is liquid remaining in the storage member, the emitted light is passed into the liquid without being reflected at the second face of the prism, and therefore, does not reach the light receiving means. On the other hand, when there is no liquid remaining in either the liquid tank or the storage member, the emitted light is reflected at the first face or the second face and reaches the light receiving means. Accordingly, when light is detected by the light receiving means, this state can be interpreted to mean that the amount of remaining liquid is low and the tank must be replaced, and when light is not detected by the light receiving means, this state can be interpreted to mean that a sufficient amount of liquid remains and there is no need to replace the tank.

Preferably, according to the present invention, the liquid tank is detachable from the storage member, the prism is mounted in the liquid tank, and the light receiving means is disposed in such a position as to be able to directly receive the light from the light emitting means when the prism does not exist. In this device, when the liquid tank is not mounted, the light receiving means directly receives the light emitted from the light emitting means, which is equivalent to the condition in which neither the liquid tank nor the storage member contains oil.

Preferably, according to the present invention, the liquid detection device is used as a device for detecting the presence or absence of an offset prevention oil in a fusing unit provided in an electrophotographic apparatus.

According to the present invention, when the liquid detection device is used in a fusing unit provided in an electrophotographic apparatus, preferably the shape of the prism and the locations of the light emitting means and the light receiving means are determined so that the light emitting means and the light receiving means are kept away from a high temperature area near a fusing heat roller. In this liquid device apparatus, the light emitting means and the light receiving means can be prevented from being exposed to high temperatures, and its performance prevented from degrading.

Furthermore, according to the present invention, there is provided an electrophotographic apparatus comprising a fusing unit that is equipped with the above liquid detection device as a device for detecting the presence or absence of an offset prevention oil.

BRIEF DESCRIPTION OF THE DRAWINGS

Further features and advantages of the present invention will be apparent from the following description with reference to the accompanying drawings, in which:

FIGS. 6A1, 6A2, 6B1, and 6B2 are diagrams for explaining how the light route changes depending on the presence or absence of oil in an impregnated member: FIGS. 6A1 and 6A2 are a plan view and a front view, respectively, showing the light path when there is oil in the impregnated member, and FIGS. 6B1 and 6B2 are a plan view and a front view, respectively, showing the light path when there is no oil in the impregnated member;

FIGS. 7A and 7B are cross-sectional views, showing a portion of the prism mounted in the nozzle of the oil tank, for explaining how the light route changes depending on the presence or absence of oil in the oil tank: FIG. 7A shows the light path when there is oil in the oil tank, and FIG. 7B shows the light path when there is no oil in the oil tank;

FIG. 8 is a diagram for explaining the relationship among the presence or absence of the oil tank, the presence or absence of oil in the tank, the presence or absence of oil in the impregnated member, and the light detection or non-detection state of a photo interrupter; and FIG. 9 is a flowchart illustrating the processing procedure performed in a controller.

DESCRIPTION OF THE PREFERRED EMBODIMENTS

An embodiment of the present invention will be described with reference to the accompanying drawings.

Figure 1:
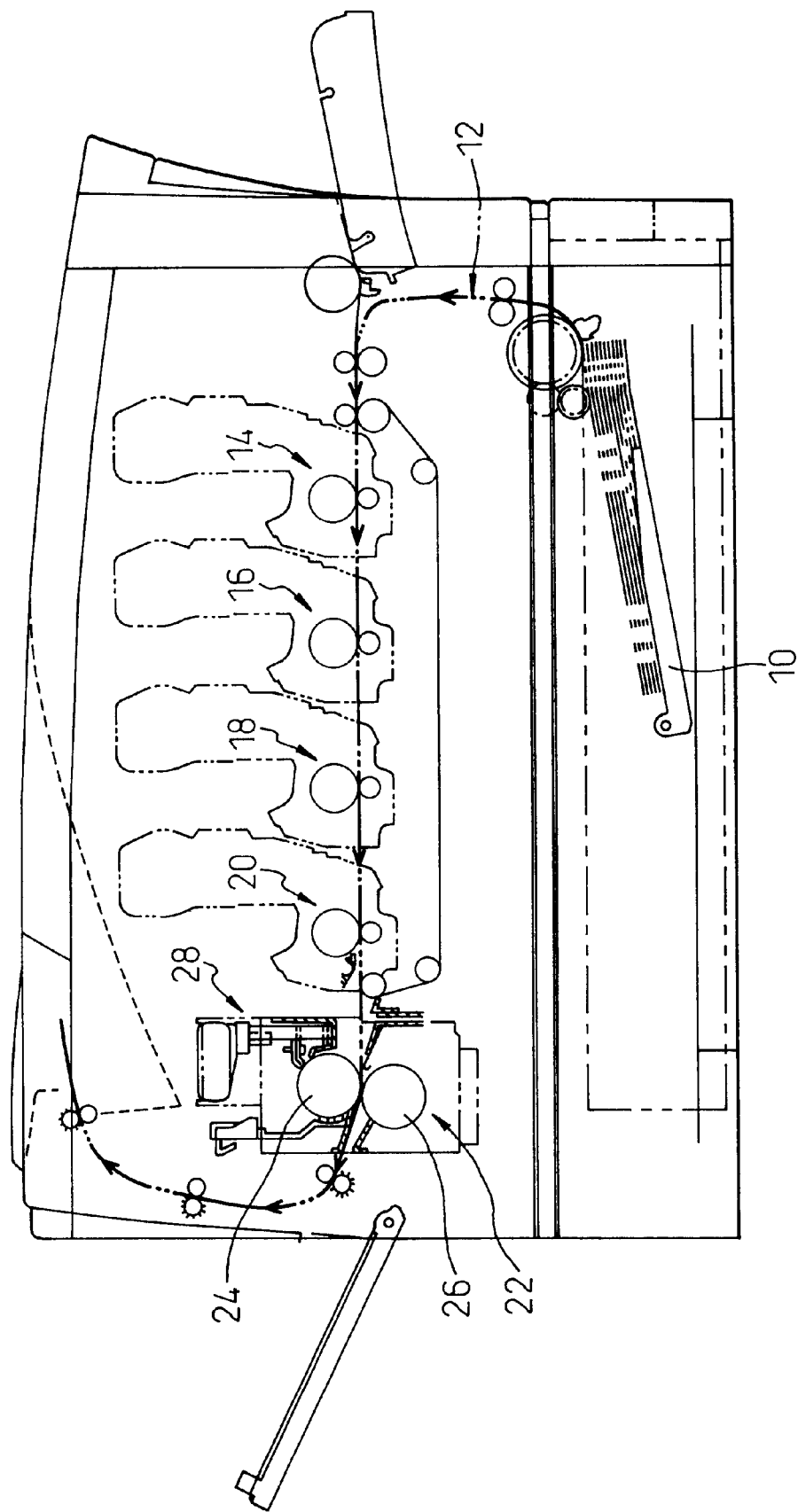
FIG. 1 is a cross-sectional view showing one example of an electrophotographic color printer containing therein a fusing unit equipped with an oil detection device as one embodiment of a liquid detection device according to the present invention.

FIG. 1 is a cross-sectional view showing one example of an electrophotographic color printer containing therein a fusing unit equipped with an oil detection device as one embodiment of a liquid detection device according to the present invention. As shown in the figure, print units 14, 16, 18, and 20 for forming monochromatic images of yellow, magenta, cyan, and black, respectively, are arranged in a paper route 12 along which paper fed from a paper cassette 10 is transported. The toner images formed by the respective print units are melted and pressed in the fusing unit 22 to produce a desired full-color image print. The fusing unit 22 comprises a heat roller (fusing roller) 24, a pressure roller 26, and an oil application device (oil supply mechanism) 28.

Figure 2:
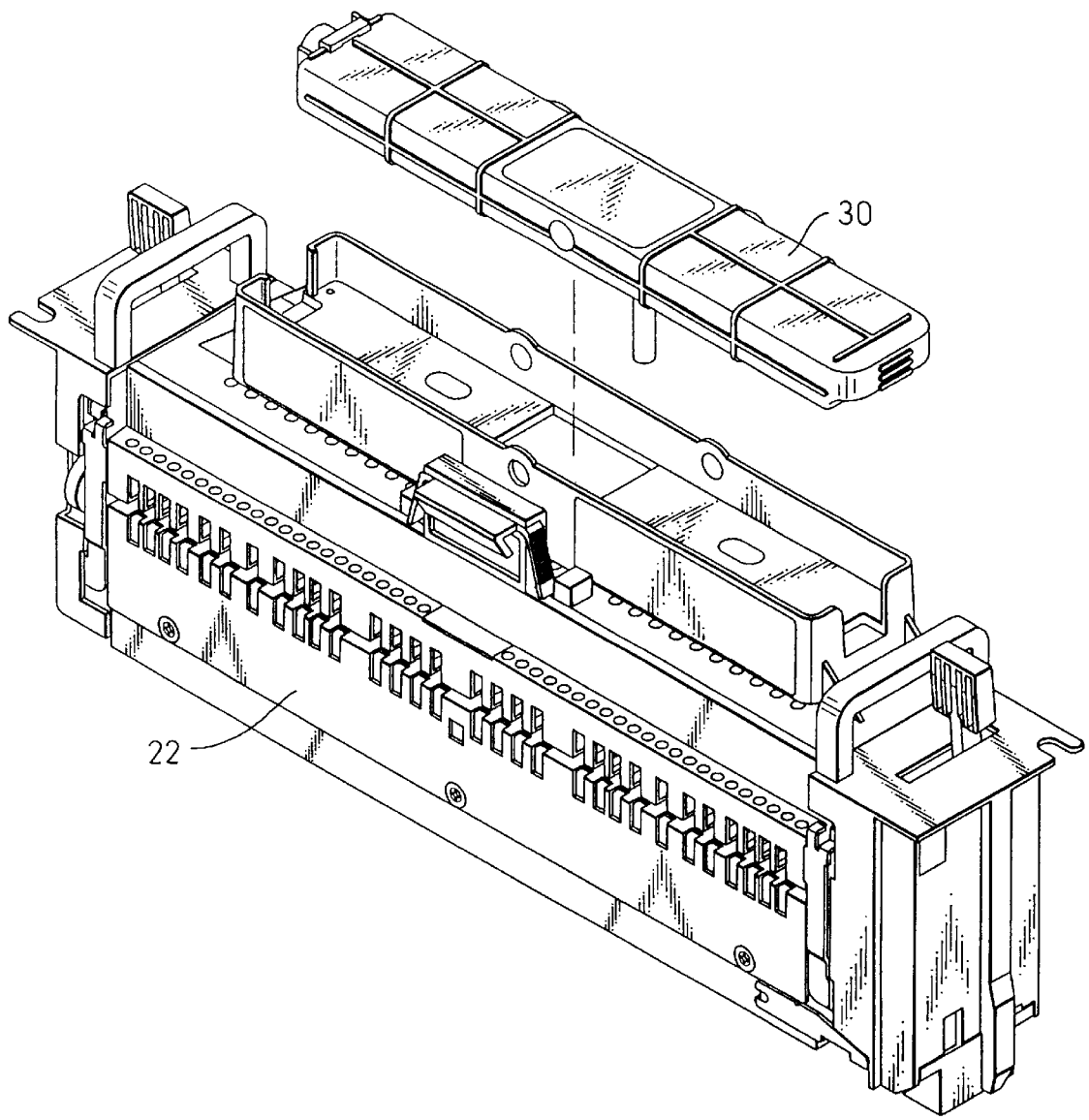
FIG. 2 is a perspective view showing one example of a fusing unit.
Figure 3:
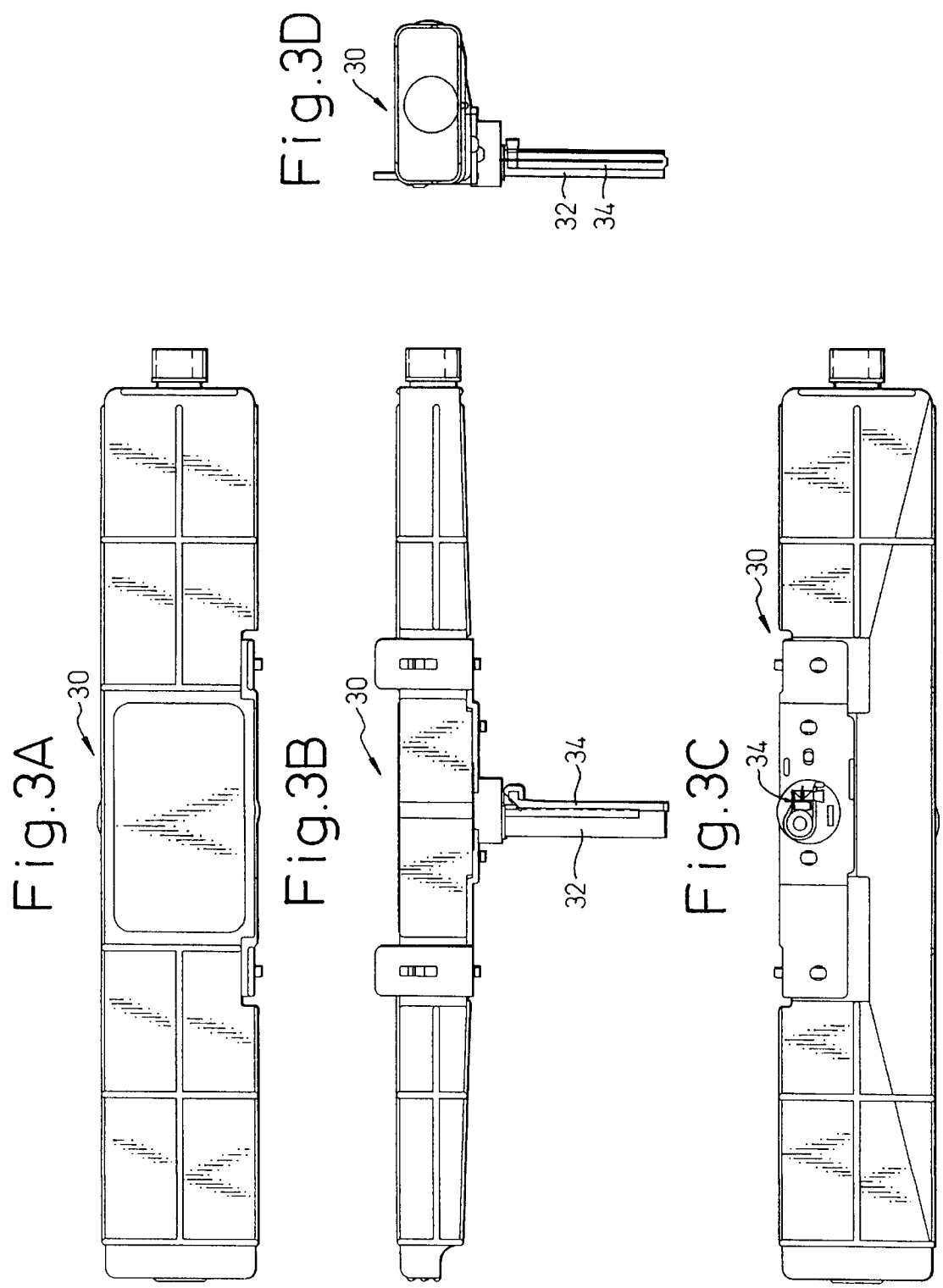
FIGS. 3A, 3B, 3C, and 3D are a plan view, a front view, a right side view, and a bottom view, respectively, showing the external appearance of an oil tank.

FIG. 2 is a perspective view showing the fusing unit 22. An oil tank 30 is detachably mounted on the fusing unit 22.

FIGS. 3A, 3B, 3C, and 3D are a plan view, a front view, a right side view, and a bottom view, respectively, showing the external appearance of the oil tank 30. As shown, a prism 34 which forms part of the oil detection device of the present invention is mounted in a nozzle 32 of the oil tank 30.

Figure 4:
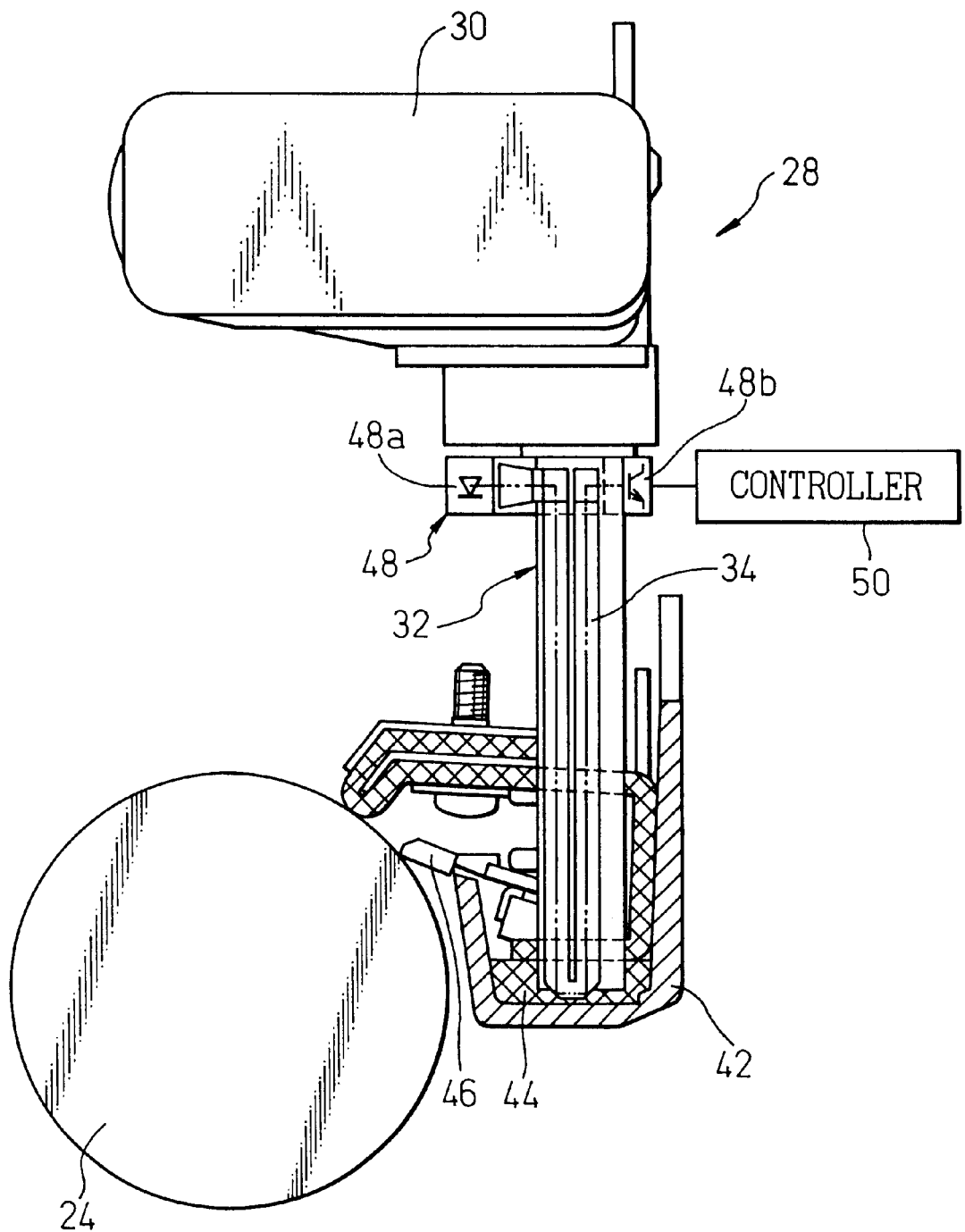
FIG. 4 is a cross-sectional view showing an oil application device along with a heat roller.

FIG. 4 is a cross-sectional view showing the oil application device 28 along with the heat roller 24. The oil application device 28 is fixed to the fusing unit 22 by means of screws or the like. The oil tank 30 is detachably mounted on the oil application device 28 so that it can be easily replaced. Oil stored in the oil tank 30 is introduced through the nozzle 32 into an oil pan 42 where the oil is temporarily stored. The oil is made to seep into an impregnated member 44 made of a porous material such as a felt or sponge, because the oil must be applied in small quantities along the entire width of the heat roller 24. The oil impregnated into the impregnated member 44 is applied little by little to the heat roller. The amount of applied oil is limited by a blade 46.

A photo interrupter 48, an integrally constructed transparent optical coupling device, is attached to the oil application device 28 and, together with the prism 34 mounted in the nozzle 23, forms the oil detection device. The photo interrupter 48 comprises a light emitting part 48$a$ and a light receiving part 48$b$, and detects the presence or absence of an object between the light emitting part and light receiving part by detecting whether the light emitted from the light emitting part 48$a$ is received by the light receiving part 48$b$. Using the photo interrupter facilitates the implementation of the present invention, but it is of course possible to accomplish the same function by providing the light emitting means and light receiving means as separate components. The photo interrupter 48 is connected to a controller 50 internal to the electrophotographic color printer; the controller 50 comprises a central processing unit (CPU), memory, etc.

As shown in FIG. 4, the shape of the prism 34 and the location of the photo interrupter 48 are determined so that the photo interrupter 48 (light emitting part and light receiving part) is kept away from the high temperature area near the heat roller 24. The photo interrupter 48 (light emitting part and light receiving part) as an electronic device can thus be prevented from being exposed to high temperatures and its performance prevented from degrading. Oil detection according to the present invention will be described in detail below.

Figure 5A:
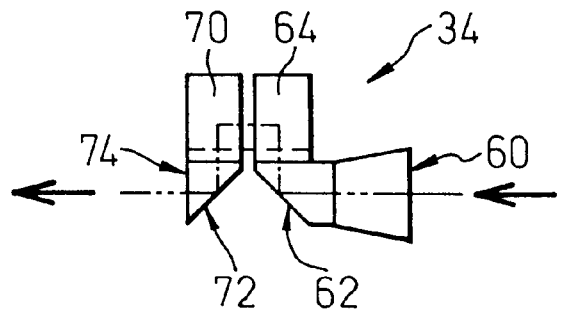
FIGS. 5A, 5B, and 5C are a plan view, a front view, and a left side view, respectively, for explaining the shape of a prism and its light path.
Figure 5C:
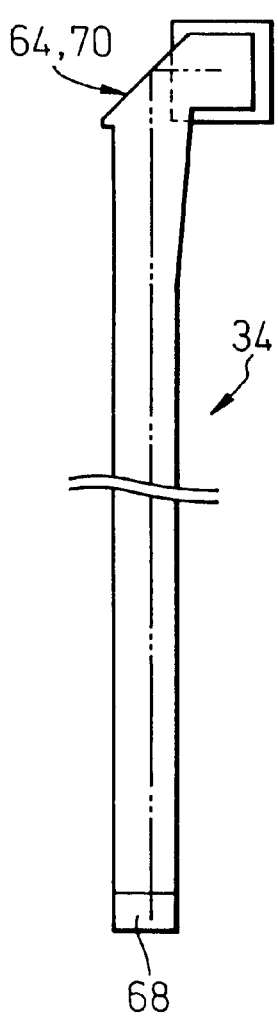
Figure 5B:
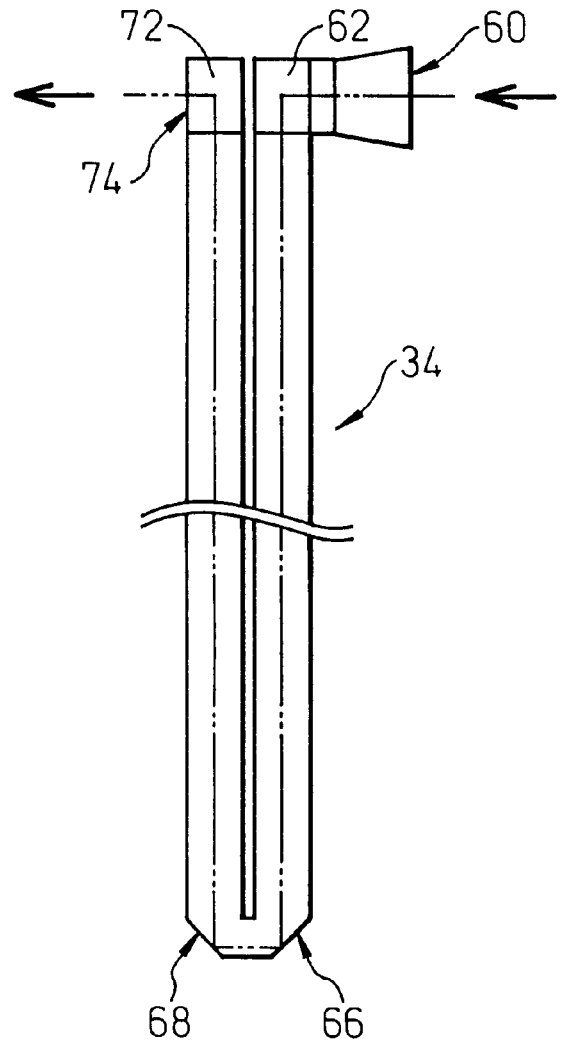

FIGS. 5A, 5B, and 5C are a plan view, a front view, and a left side view, respectively, for explaining the shape of the prism 34 and its light path. The two-dot dashed line indicates the light path when the prism 34 is placed in the air. Light emitted from the light emitting part of the photo interrupter 48 enters perpendicular to a face 60 from a horizontal direction, and passes through the prism toward a face 62. The incident light striking the face 62 at an incident angle of 45° is totally reflected and directed toward a face 64 by changing direction by 90° in the horizontal direction.

The light striking the face 64 at an incident angle of 45° is totally reflected and directed toward a face 66 by changing direction by 90° in the downward direction. Next, the light striking the face 66 at an incident angle of 45° is totally reflected and directed toward a face 68 by changing direction by 90° in the horizontal direction. The light striking the face 68 at an incident angle of 45° is totally reflected and directed toward a face 70 by changing direction by 90° in the upward direction.

The light striking the face 70 at an incident angle of 45° is totally reflected and directed toward a face 72 by changing direction by 90° in the horizontal direction. Next, the light striking the face 72 at an incident angle of 45° is totally reflected and directed toward a face 74 by changing direction by 90° in the horizontal direction. Finally, the light incident perpendicular to the face 74 leaves the prism without changing direction. The light that left the prism enters the light receiving part of the photo interrupter 48.

FIGS. 6A1, 6A2, 6B1, and 6B2 are diagrams for explaining how the light route changes depending on the presence or absence of oil in the impregnated member: FIGS. 6A1 and 6A2 are a plan view and a front view, respectively, showing the light path when there is oil in the impregnated member, while FIGS. 6B1 and 6B2 are a plan view and a front view, respectively, showing the light path when there is no oil in the impregnated member.

As shown in FIGS. 6A2 and 6B2, when the oil tank 30 is mounted on the application device body, the faces 66 and 68 of the prism 34 (see FIGS. 5B and 5C) are pressed against the impregnated member 44 so that the faces can contact the oil contained therein.

When there is no oil in the impregnated member 44, the light emitted from the light emitting part 48a of the photo interrupter 48 is reflected at the faces 66 and 68 and reaches the light receiving part 48b of the photo interrupter 48, as shown in FIGS. 6B1 and 6B2. On the other hand, when there is oil in the impregnated member 44, no reflections occur at the face 66 because of the refractive index, so that the light is passed into the oil, as shown in FIGS. 6A1 and 6A2, and the light path explained with reference to FIGS. 5A, 5B, and 5C is thus cut off in the middle. As a result, the light does not reach the light receiving part 48b of the photo interrupter 48.

FIGS. 7A and 7B are cross-sectional views, showing a portion of the prism 34 mounted in the nozzle 32 of the oil tank 30, for explaining how the light route changes depending on the presence or absence of oil in the oil tank. FIG. 7A shows the light path when there is oil in the oil tank, while FIG. 7B shows the light path when there is no oil in the oil tank. As shown in the figures, the prism 34 is mounted so that its faces 64 and 70 (see FIGS. 5A and 5C) can directly contact the oil contained in the tank.

Accordingly, when there is no oil in the tank, the light is reflected at the face 64, as shown in FIG. 7B; on the other hand, when there is oil in the tank, no reflections occur at the face 64 because of the refractive index, so that the light is passed into the oil, as shown in FIG. 7A, and the light path explained with reference to FIGS. 5A, 5B, and 5C is thus cut off in the middle. The light passed into the oil is interrupted by the oil or by the wall of the oil tank opposite to the wall from which the light entered, and does not reach the light receiving part 48b of the photo interrupter 48.

In this way, when there is oil in at least either the oil tank 30 or the impregnated member 44, the light emitted from the light emitting part 48a of the photo interrupter 48 is passed into the oil through a prism face located partway along the light path, and therefore, does not reach the light receiving part 48b of the photo interrupter 48. On the other hand, when neither the oil tank 30 nor the impregnated member 44 contains oil, the emitted light reaches the light receiving part 48b of the photo interrupter 48. When the oil tank 30 itself is not mounted on the application device body, the light receiving part 48b directly receives the light emitted from the light emitting part 48a, which is equivalent to the condition in which neither the oil tank 30 nor the impregnated member 44 contains oil.

Summarizing the above description, the relationships among the presence or absence of the oil tank 30, the presence or absence of oil in the tank 30, the presence or absence of oil in the impregnated member 44, and the light detection or non-detection state of the photo interrupter 48 can be defined as shown in the list of FIG. 8. As can be seen from FIG. 8, light detection is possible when the oil tank 30 is not mounted, or when neither the oil tank 30 nor the impregnated member 44 contains oil. In either case, since the oil application device 28 cannot apply oil, it is not appropriate to operate the fusing unit 22; as a result, the printer is rendered not ready for printing.

FIG. 9 is a flowchart illustrating the processing procedure performed in the controller 50. First, in step 102, it is determined whether light is interrupted in the photo interrupter 48; if light is interrupted (no light is detected), the process proceeds to step 104, but if light is not interrupted (light is detected), the process proceeds to step 110.

In step 104, it is determined that no oil remains in either the tank 30 or the impregnated member 44. In the next step 106, the printer is set not ready for printing. Further, in step 108, a tank replacement request is issued, requesting the operator to replace the oil tank. After that, the process loops back to step 102.

In step 110 which is carried out when light is detected, it is determined that there is oil remaining in either the tank 30 or the impregnated member 44 or in both. Next, in step 112, the process waits until a prescribed time elapses. Finally, in step 114, the printer is set ready for printing.

In this way, when there is oil remaining in the impregnated member, the tank replacement request is not issued; this avoids the problem of the prior art that when there is oil remaining in the impregnated member, the tank is replaced and oil is excessively supplied to the impregnated member. Further, the printer is set ready for printing after a prescribed time has elapsed, as shown in steps 112 and 114, because immediately after the tank is replaced when there is no oil remaining in either the tank or the impregnated member, oil is not yet sufficiently impregnated into the impregnated member and it takes a finite time before the impregnated member can be filled with oil. This finite time varies from apparatus to apparatus, and must be determined by experiment. In this way, the impregnated member is filled with sufficient oil so that an adequate amount of oil can always be applied.

As described above, according to the liquid detection device of the present invention, in a liquid supply mechanism equipped with a storage member for temporarily storing a liquid for supply and a liquid tank for replenishing the storage member with the liquid, a condition in which both the storage member and tank have been depleted of the liquid and a condition in which there is liquid remaining in at least either the storage member or the tank can be easily discriminated using a single mechanism.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A liquid detection device for detecting the presence or absence of a liquid, said device equipped with a storage member for temporarily storing said liquid for supply and a liquid tank for replenishing said storage member with said liquid, said device comprising:

a prism for forming a light path, having at least a first side which, when there is no liquid remaining in said liquid tank, reflects incident light into said prism and, when there is said liquid remaining in said liquid tank, lets said incident light pass therethrough into said liquid, and a second side which, when there is no liquid remaining in said storage member, reflects incident light into said prism and, when there is said liquid remaining in said storage member, lets said incident light pass therethrough into said liquid;

light emitting means for emitting light into said prism; and light receiving means disposed in such a position as to be able to receive light that was emitted into said prism, reflected at said first side or said second side, and passed through said prism.

2. A liquid detection device as claimed in claim 1, wherein said liquid tank is detachable from said storage member, said prism is mounted in said liquid tank, and said light receiving means is disposed in such a position as to be able to directly receive said light from said light emitting means when said prism does not exist.

3. A liquid detection device as claimed in claim 1, wherein when a transition is made from a condition in which light is detected by said light receiving means to a condition in which light is not detected by said light receiving means, it is determined that said liquid exists only after a prescribed time has elapsed from said transition.

4. A fusing unit in an electrophotographic apparatus, which is equipped with a liquid detection device, as claimed in any one of claims 1 to 3, as a device for detecting the presence or absence of an offset prevention oil.

5. A fusing unit as claimed in claim 4, wherein the shape of said prism and the locations of said light emitting means and said light receiving means are determined so that said light emitting means and said light receiving means are kept away from a high temperature area near a fusing heat roller.

6. An electrophotographic apparatus comprising a fusing unit that is equipped with a liquid detection device, as claimed in any one of claims 1 to 3, as a device for detecting the presence or absence of an offset prevention oil.

7. An electrophotographic apparatus as claimed in claim 6, wherein said apparatus is set not ready for printing when it is determined by said liquid detection device that no liquid remains.

* * * * *